(12) United States Patent
Arora et al.

(10) Patent No.: US 11,188,904 B2
(45) Date of Patent: Nov. 30, 2021

(54) METHODS, SYSTEM AND COMPUTER PROGRAM PRODUCTS FOR WIRELESS DEVICE BASED AUTHENTICATION

(71) Applicant: Mastercard International Incorporated, Purchase, NY (US)

(72) Inventors: Ankur Arora, New Delhi (IN); Amit Gupta, Delhi (IN); Shashank Kumar Trivedi, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 328 days.

(21) Appl. No.: 16/220,472

(22) Filed: Dec. 14, 2018

(65) Prior Publication Data

US 2019/0188707 A1    Jun. 20, 2019

(30) Foreign Application Priority Data

Dec. 15, 2017  (IN) .............................. 201711045221

(51) Int. Cl.
*G06Q 20/40* (2012.01)
*G06Q 20/32* (2012.01)

(52) U.S. Cl.
CPC ......... *G06Q 20/40* (2013.01); *G06Q 20/3223* (2013.01); *G06Q 20/3224* (2013.01); *G06Q 20/3227* (2013.01)

(58) Field of Classification Search
CPC ............... G06Q 20/40; G06Q 20/3223; G06Q 20/3224; G06Q 20/3227
USPC ............................................................... 705/67
See application file for complete search history.

(56) References Cited

U.S. PATENT DOCUMENTS

| 6,269,348 | B1 | 7/2001 | Pare et al. |
| 7,533,809 | B1 | 5/2009 | Robinson et al. |
| 8,655,782 | B2 | 2/2014 | Poon et al. |
| 10,467,615 | B1 * | 11/2019 | Omojola ................ G06Q 20/32 |
| 2002/0194141 | A1 | 12/2002 | Langensteiner et al. |

(Continued)

FOREIGN PATENT DOCUMENTS

| EP | 2863669 A1 | 4/2015 |
| WO | 2015/199777 A1 | 12/2015 |

OTHER PUBLICATIONS

Examination Report for Indian Application No. 201711045221, dated Aug. 20, 2020, 6 pages.

*Primary Examiner* — James D Nigh
(74) *Attorney, Agent, or Firm* — Jordan IP Law, LLC

(57) ABSTRACT

The present invention relates to the field of electronic transactions, and provides methods and systems for reducing user interventions necessary for authentication of transactions. In an embodiment the invention implements an authentication server configured to receive from a terminal device an electronic payment transaction request and device IDs corresponding to devices having wireless communication capability that are detected within a wireless communication range of the terminal device. The authentication server selects a payment account for implementing the requested electronic payment transaction, wherein selection of the payment account is based on a determination that one or more of the device IDs received from the terminal device are associated with the identified payment account, and thereafter generates a payment transaction authentication decision.

18 Claims, 8 Drawing Sheets

(56) References Cited

U.S. PATENT DOCUMENTS

| | | |
|---|---|---|
| 2005/0269402 A1 | 12/2005 | Spitzer et al. |
| 2015/0227728 A1 | 3/2015 | Grigg et al. |
| 2017/0068956 A1* | 3/2017 | Jones ................... G06Q 20/401 |
| 2018/0191501 A1* | 7/2018 | Lindemann ........... G06F 3/0647 |
| 2019/0095925 A1* | 3/2019 | Gabriele ................ G06Q 20/20 |

* cited by examiner

METHODS, SYSTEM AND COMPUTER PROGRAM PRODUCTS FOR WIRELESS DEVICE BASED AUTHENTICATION

CROSS-REFERENCE TO RELATED APPLICATIONS

This application claims the benefit of and priority to Indian Patent Application No. 201711045221, filed Dec. 15, 2017, the contents of which is incorporated herein by reference in its entirety.

FIELD OF THE INVENTION

The present invention relates to the field of electronic transactions, and more specifically to methods and systems for reducing user interventions necessary for authentication of transactions.

BACKGROUND OF THE INVENTION

Electronic transactions and payments using payment cards or electronic payment accounts are increasingly common—with the number of electronic payment transactions and ubiquity of electronic transaction mechanisms and services growing steadily.

Electronic transaction systems uniformly implement one or more authentication mechanisms to ensure that requested transactions are only permitted if received from an authorized individual/entity. Authentication mechanisms include several different approaches, including for example, single-factor authentication or multi-factor authentication. Authentication mechanisms can also vary depending on a required level of security—for example, low security transactions can rely on static password/passcode type authentication, while higher security transactions can require one or more of multi-factor authentication, dynamic password generation, biometric authentication, etc.

Prior art authentication mechanisms additionally require identification of an electronic transaction account, payment card, or payment card account that is to be debited in connection with the proposed electronic transaction. Identification of an electronic transaction account and/or authentication of a person authorized to use such account, in some prior art systems, required users to present a device or token (such as a magnetic stripe card) that enabled a terminal device to read information identifying the concerned account. Possession of the device or token also served as an additional authentication mechanism—as it is presumed that the person presenting the device or token is the person authorized to hold/use such device or token. Such systems present difficulties in cases where the device or token are not in possession of the authorized user (for example, a customer forgets to carry his credit card or debit card). In other systems, an electronic transaction account, payment card or payment card account may be identified based on user input provided at a user input device, which user input typically comprises a numeric or alphanumeric ID corresponding to the electronic transaction account, payment card or payment card account. These mechanisms typically offer a poor user experience, particularly since the user may be required to memorize several different numeric or alphanumeric IDs for each of her/his accounts or payment cards, added to which entering such IDs at an input device can be inconvenient.

There is accordingly a need for systems and methods that reduce active interventions required by a user for authentication purposes, and which facilitate passive authentication of a user, while retaining appropriate levels of transaction security.

SUMMARY

The invention relates to methods and systems for reducing user interventions necessary for authentication of transactions. The present invention provides efficient and secure mechanisms to address the above requirements. Additionally, the invention enables these mechanisms to be implemented using terminal devices that are capable of wireless communication, including for example, point-of-sale (POS) terminals having wireless capabilities.

The invention provides A method for authentication of an electronic transaction. The method comprises (i) receiving from a terminal device, an electronic payment transaction request, and device IDs corresponding to devices having wireless communication capability that are detected within a wireless communication range of the terminal device; (ii) selecting a payment account for implementing the requested electronic payment transaction, wherein selection of the payment account is based on a determination that one or more of the device IDs received from the terminal device are associated with the identified payment account, and (iii) generating a payment transaction authentication decision.

In a method embodiment (i) the selected payment account is identified from among a plurality of payment accounts, (ii) each of said plurality of payment accounts has a corresponding set of device IDs associated therewith, such that (a) each corresponding set of device IDs comprises a plurality of device IDs, wherein each device ID within the plurality of device IDs corresponds to a distinct device having wireless communication capability, and (b) each corresponding set of device IDs is distinct from sets of device IDs that are associated with other payment accounts within the plurality of payment accounts, and (iii) selection of the payment account from among the plurality of payment accounts is based on a determination that all device IDs within a set of device IDs corresponding to the selected payment account have been detected within the wireless communication range of the terminal device.

In a more particular embodiment, responsive to receiving authentication information that matches an authentication key associated with the selected payment account, the payment transaction authentication decision may comprise a decision approving the electronic payment transaction request. Alternatively, responsive to receiving authentication information that does not match an authentication key associated with the selected payment account, the payment transaction authentication decision may comprise a decision declining the electronic payment transaction request.

The payment transaction authentication decision may in an embodiment be based on one or more transaction instructions associated with either the selected payment account or with the set of device IDs associated with the selected payment account.

In an embodiment, the payment transaction authentication decision is based on proximity data representing proximity of at least two devices having wireless communication capability, relative to each other. In one such embodiment, the set of device IDs associated with the selected payment account includes device IDs corresponding to each of said at least two devices.

The payment transaction authentication decision may based on a determination that the proximity data conforms to one or more predefined proximity rules associated with the selected payment account.

In a specific embodiment of the method, responsive to a determination that the at least two devices having wireless communication capability satisfy a defined minimum threshold for device proximity relative to each other, the payment transaction authentication decision may comprise a decision approving the electronic payment transaction request. Alternatively, responsive to a determination that the at least two devices having wireless communication capability fail to satisfy a defined minimum threshold for device proximity relative to each other, the payment transaction authentication decision may comprise a decision declining the electronic payment transaction request.

The payment transaction authentication decision may be based on data corresponding to any one or more of (i) global navigational satellite system sensors associated with one or more of the at least two devices, (ii) audio, Bluetooth, Wi-Fi, near-field-communication (NFC), infra-red or optical sensors associated with one or more of the at least two devices, (iii) identifiers corresponding to network nodes with which one or more of the at least two devices have communicated, (iv) position estimation(s) received from a cellular radio network in respect of one or more of the at least two devices, and (v) parameter attributes received from accelerometers, barometers, temperature sensors, sensors for magnetic or electric fields, or strain force sensors implemented within or affixed to one or more of the at least two devices.

The invention additionally provides a system for authentication of an electronic transaction. The system comprises a processor implemented authentication server configured to (i) receive from a terminal device an electronic payment transaction request, and device IDs corresponding to devices having wireless communication capability that are detected within a wireless communication range of the terminal device, (ii) select a payment account for implementing the requested electronic payment transaction, wherein selection of the payment account is based on a determination that one or more of the device IDs received from the terminal device are associated with the identified payment account, and (iii) generate a payment transaction authentication decision.

In an embodiment of the system, (i) the selected payment account is identified from among a plurality of payment accounts, (ii) each of said plurality of payment accounts has a corresponding set of device IDs associated therewith, such that (a) each corresponding set of device IDs comprises a plurality of device IDs, wherein each device ID within the plurality of device IDs corresponds to a distinct device having wireless communication capability, and (b) each corresponding set of device IDs is distinct from sets of device IDs that are associated with other payment accounts within the plurality of payment accounts, and (iii) selection of the payment account from among the plurality of payment accounts is based on a determination that all device IDs within a set of device IDs corresponding to the selected payment account have been detected within the wireless communication range of the terminal device.

The authentication server may be configured such that (i) responsive to receiving authentication information that matches an authentication key associated with the selected payment account, the payment transaction authentication decision is a decision approving the electronic payment transaction request, or (ii) responsive to receiving authentication information that does not match an authentication key associated with the selected payment account, the payment transaction authentication decision is a decision declining the electronic payment transaction request.

In an embodiment, the authentication server is configured such that the payment transaction authentication decision is based on one or more transaction instructions associated with either the selected payment account or with the set of device IDs associated with the selected payment account.

The authentication server of the present invention may be configured such that (i) the payment transaction authentication decision is based on proximity data representing proximity of at least two devices having wireless communication capability, relative to each other, and (ii) the set of device IDs associated with the selected payment account includes device IDs corresponding to each of said at least two devices.

The authentication server may further be configured such that the payment transaction authentication decision is based on a determination that the proximity data conforms to one or more predefined proximity rules associated with the selected payment account.

In an embodiment, the authentication server is configured such that (i) responsive to a determination that the at least two devices having wireless communication capability satisfy a defined minimum threshold for device proximity relative to each other, the payment transaction authentication decision is a decision approving the electronic payment transaction request, or (ii) responsive to a determination that the at least two devices having wireless communication capability fail to satisfy a defined minimum threshold for device proximity relative to each other, the payment transaction authentication decision is a decision declining the electronic payment transaction request.

The authentication server may be configured such that the payment transaction authentication decision is based on data corresponding to any one or more of (i) global navigational satellite system sensors associated with one or more of the at least two devices, (ii) audio, Bluetooth, Wi-Fi, near-field-communication (NFC), infra-red or optical sensors associated with one or more of the at least two devices, (iii) identifiers corresponding to network nodes with which one or more of the at least two devices have communicated, (iv) position estimation(s) received from a cellular radio network in respect of one or more of the at least two devices, and (v) parameter attributes received from accelerometers, barometers, temperature sensors, sensors for magnetic or electric fields, or strain force sensors implemented within or affixed to one or more of the at least two devices.

The invention additionally provides a computer program product for authentication of an electronic transaction. The computer program product comprises a non-transitory computer usable medium having computer readable program code embodied therein, the computer readable program code comprising instructions for (i) receiving from a terminal device, an electronic payment transaction request, and device IDs corresponding to devices having wireless communication capability that are detected within a wireless communication range of the terminal device, (ii) selecting a payment account for implementing the requested electronic payment transaction, wherein selection of the payment account is based on a determination that one or more of the device IDs received from the terminal device are associated with the identified payment account, and (iii) generating a payment transaction authentication decision.

The computer program product may additionally include computer readable program code comprising instructions for implementing any one or more of the method steps described in connection with the invention.

BRIEF DESCRIPTION OF THE ACCOMPANYING DRAWINGS

DETAILED DESCRIPTION

Figure 1:
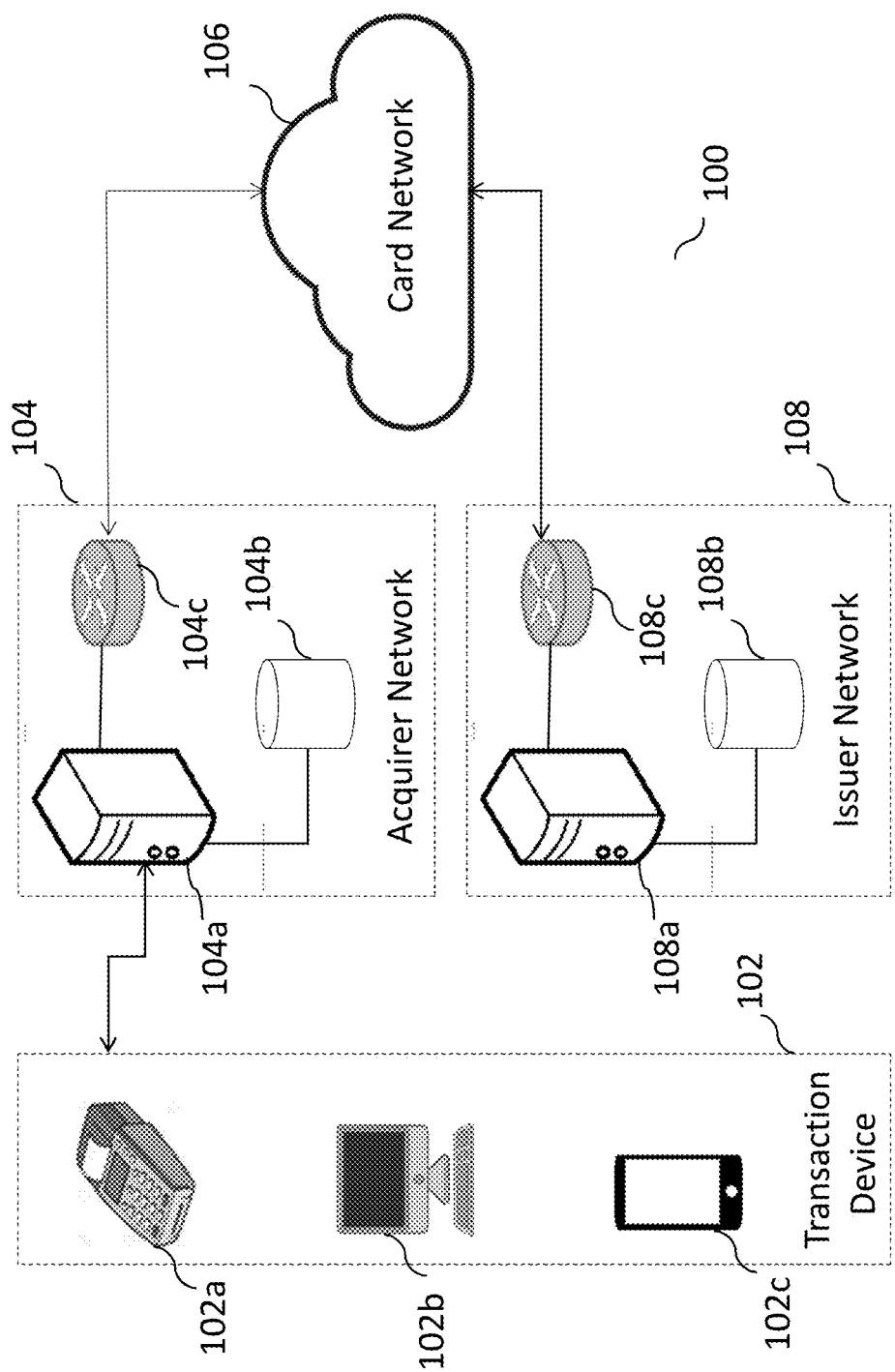
FIG. 1 illustrates a system for authenticating and implementing electronic transactions through a payment card transaction system.

The present invention provides secure authentication mechanisms for electronic transactions while reducing user interventions necessary to effect such electronic transactions.

For the purposes of the present invention, the following terms shall be understood to have the corresponding meanings provided below:

"Acquirer" shall mean a business (e.g., a financial institution or a merchant bank) that contracts with a merchant to coordinate with the issuer network of a customers' payment card.

"Acquirer network" shall refer to a communication network, including hardware, software and other equipment used by an acquirer to transmit and process card based transactions and information related to merchants, customers, payment cards and transactions.

"Card holder" or "Customer" shall mean an authorized payment card user who is making a purchase or effecting an electronic transaction with a payment card.

"Card network" shall refer to the intermediary between the merchant's acquirer and the customer's issuer (for example, Mastercard® or Visa®). The card network primarily coordinates payment card transactions between acquirers and issuers, and additionally coordinates clearing and settlement services to transfer payments from issuers to merchants.

"Device having wireless capability" shall mean any device that is capable of wireless communication with other wireless communication enabled devices. Non-limiting embodiments of devices having wireless capability include any processor driven computing devices including desktops, laptops, tablets and personal digital assistants, and telecommunication devices, having any of 1G, 2G, 3G, 4G, LTE, GPRS, EDGE, GPS, cellular, satellite, wifi, Bluetooth, Bluetooth lite and RFID-based communication capabilities, for communication other devices having corresponding wireless capabilities.

"Issuer" shall mean a financial institution that issues payment cards and maintains a contract with a customer or card holder for repayment or settlement of purchases made on the payment card.

"Issuer network" shall refer to a communication network, including hardware, software and other equipment used by an issuer to transmit and process payment card transactions and information related to customers, payment cards and transactions.

"Merchant" shall mean an authorized acceptor of payment cards for the payment of goods or services sold by the merchant.

"Passive authentication" shall mean one or both of electronic account identification or customer identity authentication, where a user does not have to affirmatively present a payment card or electronically readable token, or affirmatively provide user input through a manual input mechanism for achieving said electronic account identification or user identity authentication.

"Payment card" shall mean a card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

"Payment account" shall mean any account that may be used for the purposes of effecting an electronic payment or electronic transaction, and shall include any electronic transaction account, payment card account, bank account or electronic wallet account.

"Terminal device having wireless capability" shall mean any device that is (i) capable of receiving information for identifying an electronic payment account, payment card, or card holder, authenticating a card holder, and transmitting payment account information, payment card information or customer information directly or indirectly to one or more of an acquirer network, card network or issuer network and (ii) that is capable of wireless communication with other wireless communication enabled devices. Non-limiting embodiments of terminal devices having wireless capability include POS terminals, computing devices including desktops, laptops, tablets and personal digital assistants, and telecommunication devices, having any of 1G, 2G, 3G, 4G, LTE, GPRS, EDGE, GPS, cellular, satellite, wife, Bluetooth, Bluetooth lite and RFID based communication capabilities, for communication other devices having corresponding wireless capabilities.

FIG. 1 illustrates a conventional system 100 that can be used for implementing electronic transactions based on a payment card or payment card information presented by a card holder at a terminal device 102. In certain embodiments of the present invention, system 100 may be modified to implement the invention. System 100 includes terminal device 102, acquirer network 104, card network 106 and issuer network 108. While FIG. 1 has been used to illustrate a payment card based network, it would be understood that similar principles and one or more entities having some or all of the same functions may be used to effect payments through any electronic transaction account.

Acquirer network 104 may be communicably coupled with terminal device 102, and comprises server 104a, acquirer network database 104b and interface gateway 104c. Server 104a may be configured to receive and process information relating to payment card transactions. In an embodiment, the acquirer network may receive or process transactions received only from merchants having a merchant account with the acquirer—which determination may be made based on information retrieved from acquirer network database 104b. Interface gateway 104c may include a hardware or software network gateway configured to enable acquirer network 104 to communicate with card network 106.

Card network 106 may be communicably coupled to both acquirer network 104 and issuer network 108.

Issuer network 108 comprises server 108a, issuer network database 108b and interface gateway 108c. Server 108a may be configured to receive and process information relating to payment card transactions. In an embodiment, the issuer network may only receive or process transactions received from merchants having a merchant account with the issuer—which determination may be made based on information retrieved from issuer network database 108b. Interface gateway 108c may include a hardware or software network gateway configured to enable issuer network 108 to communicate with card network 106.

It would be understood that in an embodiment, when system 100 is configured to implement the present invention, terminal device 102 may comprise any terminal device having wireless capability, including without limitation a POS terminal device 102a, computing device 102b, or mobile phone or smartphone 102c.

According to various embodiments of the invention, a system or method may be provided to (i) identify a payment account and/or authenticate a requested electronic transaction, based on presentation or detection of one or more devices having wireless capability that have been previously associated with an authorized user of the payment account.

Figure 2A:
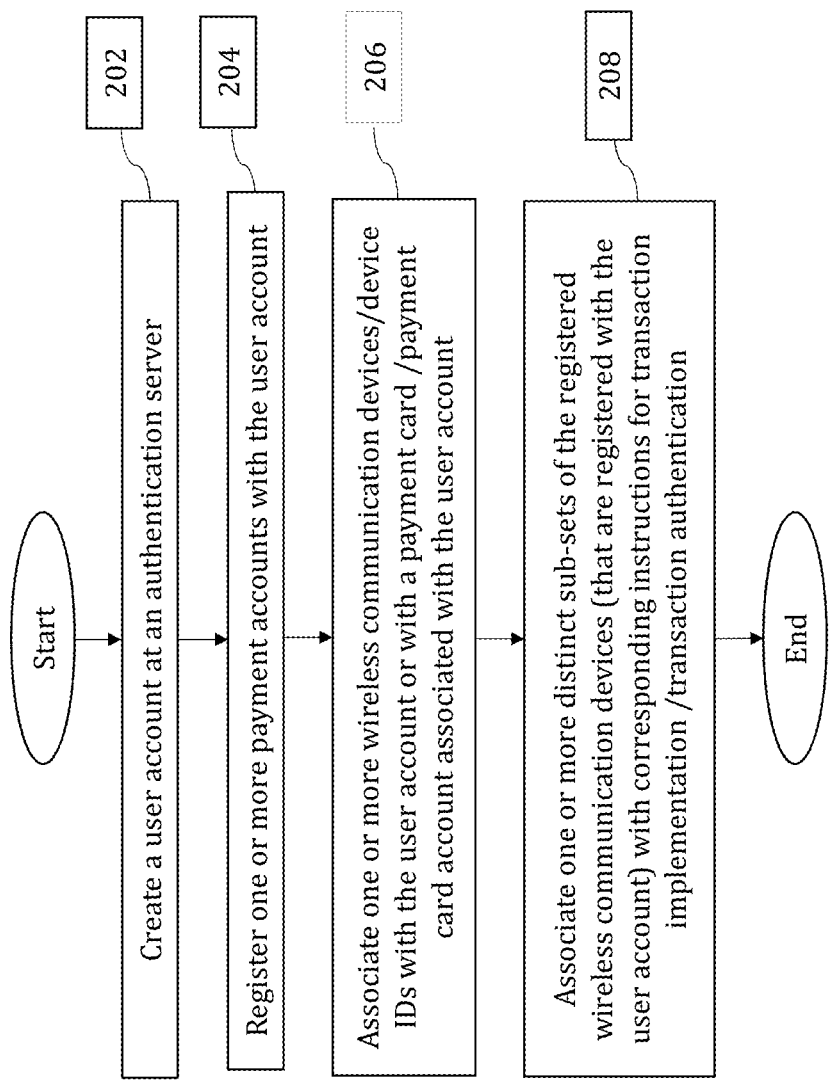
FIGS. 2A, 3 and 4 illustrate flowcharts corresponding to methods in accordance with the present invention.

In an embodiment of the invention, at least one (and preferably more than one) device(s) having wireless capability may be associated with an authorized user of a payment account. FIG. 2A illustrates an exemplary method for associating devices having wireless capability with an authorized user of a payment account.

Step 202 of FIG. 2A comprises creating a user account corresponding to an authorized user of a payment account. The user account may be created at an authentication server, and information corresponding to the user account may be stored in a non-transitory manner in any one or more user account databases that are communicably coupled to the authentication server. In an embodiment of the invention, step 202 may additionally include a step of downloading authentication application software from a database onto one or more of the wireless communication devices that are sought to be registered with the user account. The application software may be configured to implement a variety of different functions, including to facilitate creation of, modifications to, and maintenance of user accounts associated with one or more authorized users of payment cards/payment accounts.

Step 204 comprises registering or associating one or more payment accounts with the user account. Registration of a payment account with the user account may comprise providing or transmitting information associated with the payment account under registration, to the authentication server. Said information may at the very least include at least a payment account identifier and optionally a payment account name, a user name, password, and any other information required to generate payment authorization instructions in connection with said payment account.

Step 206 comprises associating (for example, by registering) a set of devices having wireless capability with the user account—wherein the registered set of devices comprises at least one, and more preferably two or more devices having wireless capability. Registration of a device having wireless capability with the user account may comprise providing to the authentication server, one or more information items associated with the authorized user corresponding to said user account, and/or corresponding to the devices having wireless capability that are under registration. Said one or more information items shall at the very least include at least one unique device identifier (ID) (for example, a MAC address or other persistent or static identifier that is associated with hardware or software within the device having wireless capability) corresponding to each device having wireless capability that is under registration. Registration of each device having wireless capability shall, in an embodiment, include recording a device name corresponding to said device, and the at least one unique device ID associated with said device, in a database. The registration process may additionally include recording other attribute information corresponding to each device that is registered in the database.

The one or more information items provided during the registration process may also include a user name, password, address, contact information, account settings, user preferences, and an indication whether the user wishes to utilize passive authentication based on detection of one or more registered devices having wireless capability.

Step 208 thereafter comprises associating one or more distinct sub-sets of the registered devices (that have been associated with a user account at step 206) with a corresponding instruction for transaction implementation or for transaction authentication. It would be understood that each distinct sub-set of devices having wireless capability may comprise one or more than one device having wireless capability. It would be further understood that the instructions for transaction implementation/transaction authentication may comprise any instruction that is sought to be initiated in response to detection of the associated distinct sub-set of devices having wireless capability. Exemplary instructions for transaction implementation/transaction authentication may include instructions for any of:

Selecting a specific payment account from among a plurality of payment accounts registered with the user account, for effecting a payment transaction Authorizing a transaction payment from a specific payment account associated with the user account Authorizing a transaction payment from a specific payment account associated with the user account, subject to a predefined transaction limit Requiring a specific authentication protocol (for example, single factor authentication, two-factor authentication, or biometric authentication) as a prerequisite to authorizing a transaction payment from a specific payment account associated with the user account In an embodiment of the invention, the user account may additionally have one or more authentication keys associated therewith, such that a transaction payment may only be authorized through the user account, provided one or more data inputs at a terminal device match one or more authentication keys associated with the user account. In a particular embodiment, the method of creating a user account that is discussed in connection with FIG. 2A may additionally include steps for receiving authentication keys from a user and associating the received authentication keys with the user account. In particular embodiments, the authentication keys associated with a user account may include any of one or more of static PINs, passwords, passcodes, or one or more biometric features associated with a user. In another embodiment, the user account may be linked to a dynamic password generator/OTP generator within an authentication server—such that a request for transaction authorization from the user account would only be approved if the request is accompanied by a dynamic password/OTP that has been transmitted from the authentication server to the authorized user (for example, to the authorized user's mobile device or email ID).

Figure 2B:
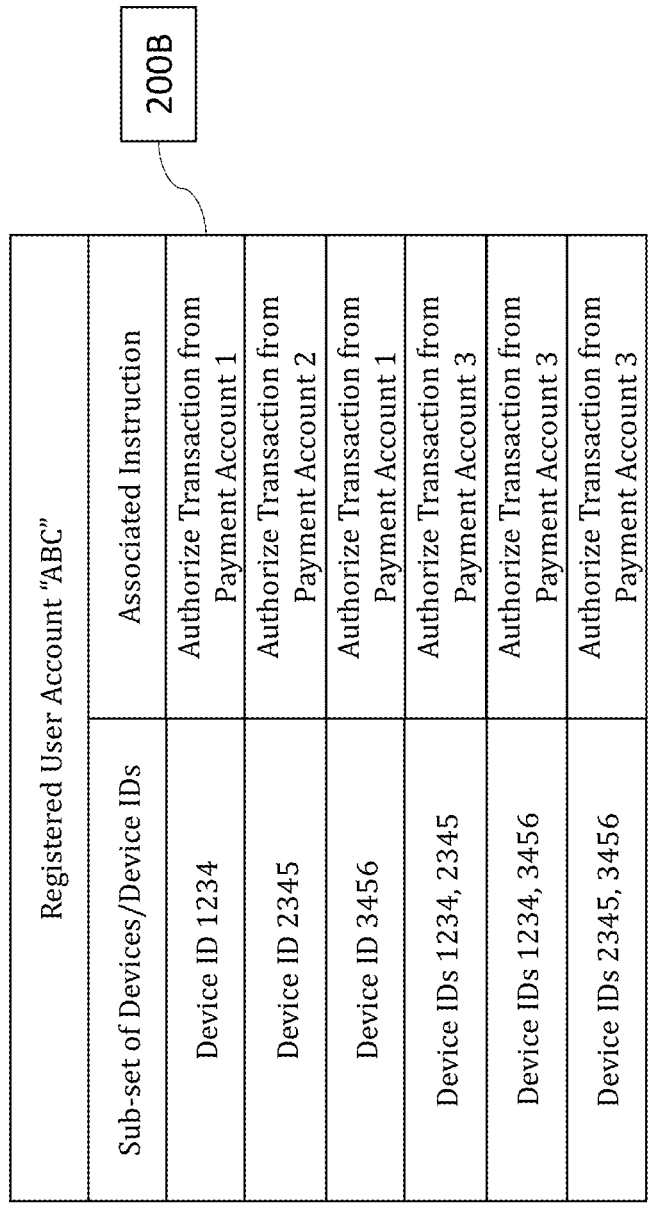
FIG. 2B illustrates an exemplary data structure configured to implement an embodiment of the present invention.

FIG. 2B illustrates an exemplary data structure 200B (for example, a database schema) or part thereof, which records various sub-sets of device IDs and their correspondingly associated transaction implementation/transaction authentication instructions, which data structure 200B may be generated by following the registration method of FIG. 2A.

Table 200B exhibits a data structure corresponding to a registered user account "ABC"—which user account has been associated with (i) 3 devices having wireless capability—comprising a first device having wireless capability and having device ID 1234, a second device having wireless capability and having device ID 2345, and a third device having wireless capability and having device ID 3456, and (ii) 3 payment accounts—namely, Payment Account 1, Payment Account 2 and Payment Account 3.

In the exemplary illustration of FIG. 2B, the registration process according to the method of FIG. 2A has resulted in the following associations:

Association of user account ABC with (i) a first sub-set of the registered devices (comprising solely of the first device having wireless capability and having device ID 1234), and (ii) a corresponding instruction to authorize payment of a requested transaction from Payment Account 1

Association of user account ABC with (i) a second sub-set of the registered devices (consisting solely of the second device having wireless capability and having device ID 2345), and (ii) a corresponding instruction to authorize payment of a requested transaction from Payment Account 2

Association of user account ABC with (i) a third sub-set of the registered devices (consisting solely of the first device having wireless capability and having device ID 3456), and (ii) a corresponding instruction to authorize payment of a requested transaction from Payment Account 1

Association of user account ABC with (i) a fourth sub-set of the registered devices (consisting of both the first device having wireless capability and device ID 1234, and the second device having wireless capability and having device ID 2345), and (ii) a corresponding instruction to authorize payment of a requested transaction from Payment Account 3

Association of user account ABC with (i) a fifth sub-set of the registered devices (consisting of both the first device having wireless capability and having device ID 1234, and the third wireless device having wireless capability and having device ID 3456), and (ii) a corresponding instruction to authorize payment of a requested transaction from Payment Account 3

Association of user account ABC with (i) a sixth sub-set of the registered devices (consisting of both the second device having wireless capability and having device ID 2345, and the third wireless device having wireless capability and having device ID 3456), and (ii) a corresponding instruction to authorize payment of a requested transaction from Payment Account 3

It would be understood from FIG. 2B, that while each associated sub-set of registered devices having wireless capability requires to be distinct from every other such sub-set of devices, different sub-sets can be associated with the same instruction for transaction implementation/transaction authentication. In a specific embodiment, each distinct sub-set of registered devices having wireless capability, may be associated with a unique instruction for transaction implementation/transaction authentication. It will also be understood that the various distinct sub-sets of registered devices having wireless capability may have one or more common devices, provided no two sub-sets are entirely identical.

In a particular embodiment of the invention, associations between instructions for transaction implementation/transaction authentication and sub-sets of devices having wireless capability, may only be permitted for sub-sets of devices having wireless capability which include at least two devices each having wireless capability. Stated differently, in this embodiment, detection of only a single wireless communication device that is found to be associated with a user account, would be insufficient to initiate an instruction for transaction implementation/transaction authentication. Successful initiation of an instruction for transaction implementation/transaction authentication would in this embodiment require detection of two or more devices having wireless capability—(i) said two or more wireless communication devices being registered with the same user account, and (ii) said two or more wireless communication devices comprising a sub-set of devices having wireless capability that has been previously associated with an instruction for transaction implementation/transaction authentication corresponding to said user account.

Figure 3:
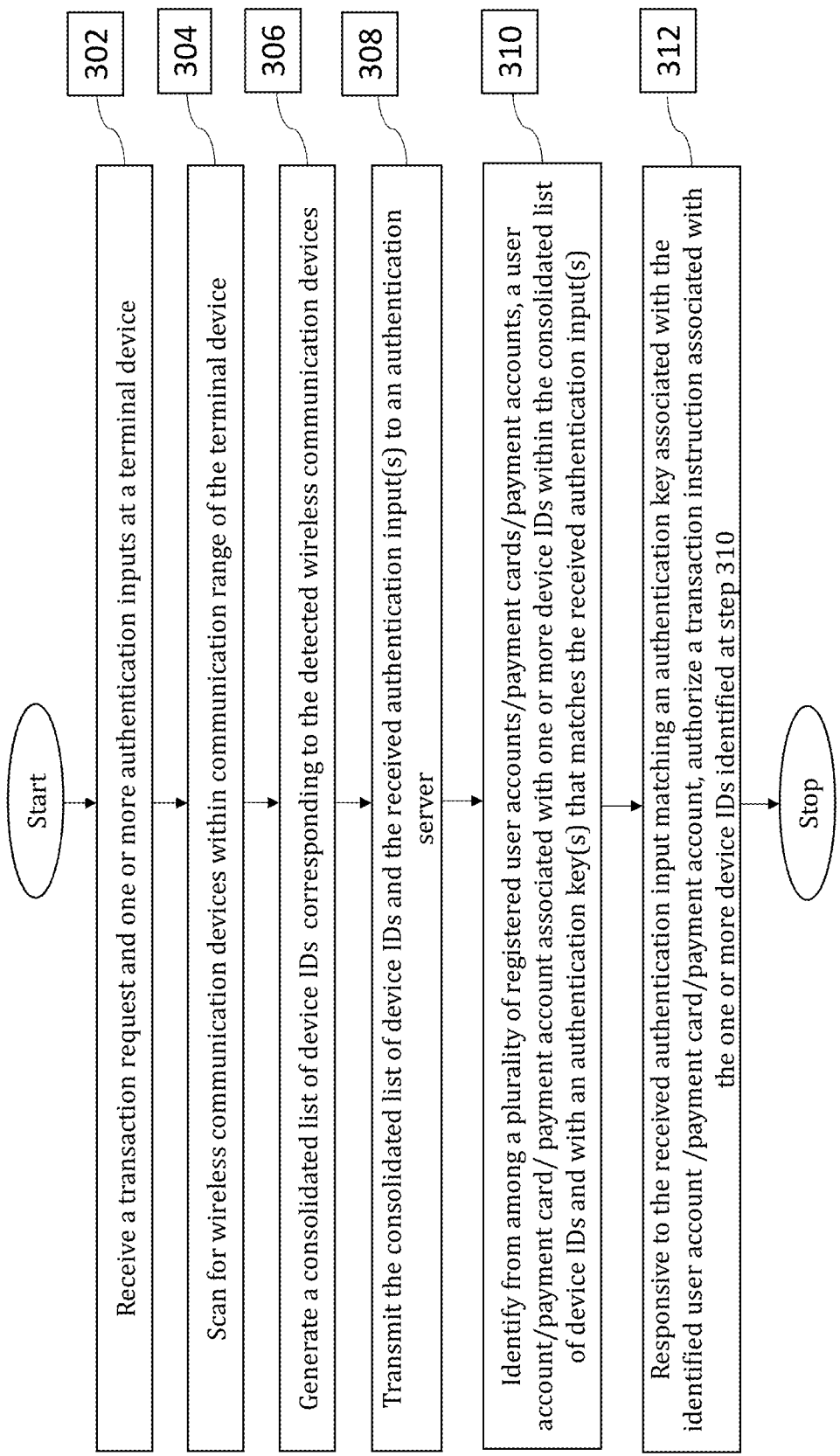

FIG. 3 illustrates a method for authenticating or implementing an electronic transaction based on detection of one or more devices having wireless capability that have been associated with a payment account or a user account in the manner that has been discussed above.

Step 302 comprises receiving a request for processing of an electronic fund transaction at a terminal device having wireless capability. Step 302 may also include the step of receiving one or more authentication inputs from the user—for example, an authentication key (such as a password, passcode, PIN or OTP) or a biometric input (for example, a fingerprint image, iris image, retina image, image of a face or one or more facial features, infrared signature, etc.).

At step 304, the terminal device detects or scans for other devices having wireless capability which are within wireless communication range of the terminal device. In an embodiment of the invention, the terminal device is configured to detect or scan for wireless communication devices having the same wireless communication capabilities as the terminal device, or having at least one of the same wireless communication capabilities as the terminal device, or having a specified wireless communication capability. In an embodiment, the terminal device may be configured to detect any wireless communication devices having any of 1G, 2G, 3G, 4G, LTE, GPRS, EDGE, GPS, cellular, satellite, wifi, Bluetooth, Bluetooth lite, infrared, ultrasonic, or RFID-based communication capabilities. Other embodiments may include other forms of communication capabilities. The detection or scanning for presence of devices having wireless capability may be carried out in any number of ways that would be apparent to the skilled person.

Step 306 comprises generating a consolidated list of device IDs corresponding to the detected wireless communication devices—which consolidated list of devices IDs comprises device IDs corresponding to each device having wireless capability that is detected within wireless communication range of the terminal device. In an embodiment, each device ID may be received at the terminal device from its corresponding device having wireless capability, through wireless communication.

At step 308, the consolidated list of device IDs and the received authentication input(s) are transmitted to an authentication server. The authentication server may in an embodiment, be an authentication server having access to user accounts that have been created and maintained in accordance with the method and data structure illustrated in connection with FIGS. 2A and 2B above.

At step 310, the authentication server searches for and identifies a user account (and optionally a specific payment account linked with said user account) that has been associated (for example, through the methods of FIG. 2A) with one or more devices having wireless capability, wherein the device IDs for each such device are included in the list of device IDs that have been transmitted to the authentication server at step 308. The authentication server may additionally determine whether an authentication key that is linked with said user account matches the authentication input (or a derivative of the authentication input) that is received at the authentication server at step 308.

Responsive to identification of an appropriate user account that satisfies one (and in an embodiment both) of the conditions of step 310, step 312 comprises authorizing or implementing a transaction instruction that is associated (in the user account) with the one or more device IDs identified at step 310.

In an embodiment of the invention, authorization or initiation of the requested payment transaction at step 310 may depend on one or both of (i) the detected device IDs that are found to match the devices having wireless capability that have been associated with the user account, and (ii) corresponding transaction instructions that have been associated with said specific device IDs.

By way of example, and referring to the registered user account ABC (illustrated in FIG. 2B), if the authentication server determines that:

(i) the list of device IDs received at step 308 consists of device ID "1234" and (ii) the authentication input received at step 308 (or information derived from said authentication input) matches an authentication key associated with user account ABC—the authentication server may implement the instruction associated with detection of device ID "1234" i.e. authorize a requested transaction payment from Payment Account 1 associated with user account ABC (i) the list of device IDs received at step 308 consists of device ID "2345" and (ii) the authentication input received at step 308 (or information derived from said authentication input) matches an authentication key associated with user account ABC—the authentication server may implement the instruction associated with detection of device ID "2345" i.e. authorize a requested transaction payment from Payment Account 2 associated with user account ABC (i) the list of device IDs received at step 308 consists of device ID "3456" and (ii) the authentication input received at step 308 (or information derived from said authentication input) matches an authentication key associated with user account ABC—the authentication server may implement the instruction associated with detection of device ID "3456" i.e. authorize a requested transaction payment from Payment Account 1 associated with user account ABC (i) the list of device IDs received at step 308 consists of device ID "1234" and device ID "2345" and (ii) the authentication input received at step 308 (or information derived from said authentication input) matches an authentication key associated with user account ABC—the authentication server may implement the instruction associated with detection of both of device ID "1234" and device ID "2345" i.e. authorize a requested transaction payment from Payment Account 3 associated with user account ABC (i) the list of device IDs received at step 308 consists of device ID "1234" and device ID "3456" and (ii) the authentication input received at step 308 (or information derived from said authentication input) matches an authentication key associated with user account ABC—the authentication server may implement the instruction associated with detection of both of device ID "1234" and device ID "3456" i.e. authorize a requested transaction payment from Payment Account 3 associated with user account ABC (i) the list of device IDs received at step 308 consists of device ID "2345" and device ID "3456" and (ii) the authentication input received at step 308 (or information derived from said authentication input) matches an authentication key associated with user account ABC—the authentication server may implement the instruction associated with detection of both of device ID "2345" and device ID "3456" i.e. authorize a requested transaction payment from Payment Account 3 associated with user account ABC As discussed above, in a particular embodiment of the invention, the method of creating or configuring a user account may necessitate that associations between instructions for transaction implementation/transaction authentication and sub-sets of devices having wireless capability can be created only for sub-sets of wireless communication devices which include at least two devices having wireless capability. In this embodiment of the invention, step 310 would comprise identification of a user account (and optionally, a specific payment account linked with said user account) that has been associated (for example, through the methods of FIG. 2A) (i) with at least two devices having wireless capability and which have device IDs that are included in the list of device IDs transmitted to the authentication server (at step 308) and also (ii) with an authentication key that matches the received authentication input (or information derived from the authentication input) that is received at the authentication server at step 308. Thereafter, step 312 would comprise authorizing or implementing a transaction instruction that has been associated (in the user account) with a sub-set of devices having wireless capability consisting of the at least two wireless communication devices.

Figure 4:
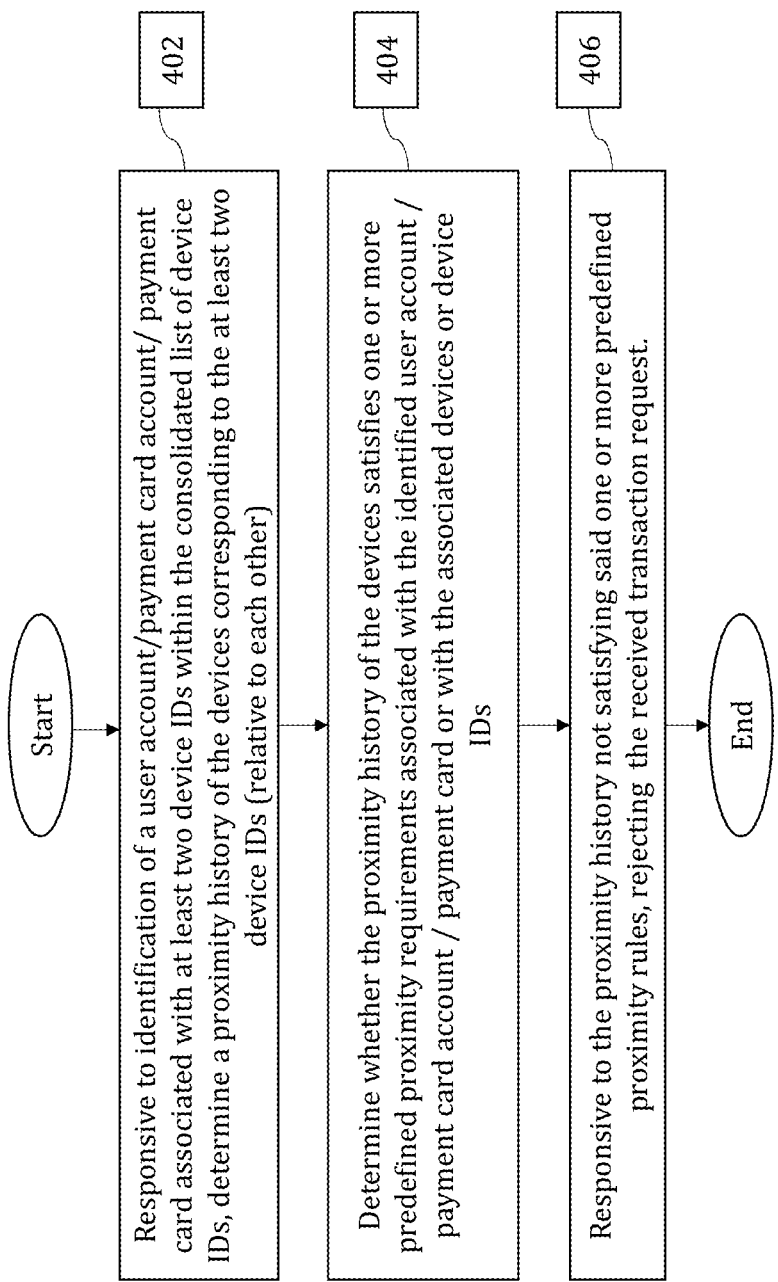

FIG. 4 discloses a more specific embodiment of the invention where initiation of an instruction for transaction implementation/transaction authentication necessarily requires detection or presentation of at least two devices having wireless capability and having device IDs that have already been associated with a user account.

The method of FIG. 4 is a method particularly configured to increase the security of the invention and to reduce the likelihood that unauthorized persons or entities can fraudulently cause transaction authentication or transaction initiation at the authentication server by spoofing device IDs of one or more devices having wireless capability that have been associated with a user account. For the purposes of ensuring secure authentication, the method of FIG. 4 relies on (i) determining whether a terminal device having wireless communication capability has detected a plurality of wireless communication devices which have device IDs that match a defined sub-set of device IDs associated with a user account transaction instruction and (ii) additionally analyzing data representing proximity (or lack of proximity) between the detected plurality of devices having wireless capability, and determining whether the analyzed data conforms to one or more predefined proximity rules associated with the user account.

The invention embodiment illustrated in FIG. 4 relies on the observation that when an authorized user legitimately carries two or more devices having wireless capability into communication range of a terminal device having wireless capabilities, such devices having wireless capability are likely to have been in proximity of each other for at least some time. For example, a person visiting a retail store with two Bluetooth enabled devices (e.g., a mobile phone and a Bluetooth enabled smart watch) is likely to have carried both devices to the retail store on her/his person, in her/his baggage, or in her/his vehicle or mode of transportation. Both devices are therefore likely to have been within a reasonable range of proximity of each other, and/or likely to have followed a substantially similar movement pattern, over a period of time preceding detection of such devices by a terminal device at the retail store. The method of FIG. 4 takes advantage of the fact that devices associated with an authorized user are likely to have been in proximity of each other, to ascertain whether device IDs detected by the terminal device are an indication of presence of genuine devices, or a consequence of spoofing or other fraudulent activity.

It would be understood that steps 402 to 406 of FIG. 4 may be implemented as an additional authentication check in connection with the methods previously discussed with reference to FIGS. 2A and 3. For the purposes of following methods steps 402 to 406, it would be understood that these method steps may in an embodiment be implemented as intermediate steps between step 310 and step 312 of FIG. 3.

Step 402 comprises responding to identification of a user account/payment card account/payment card that is associated with at least two device IDs within the consolidated list of device IDs, by ascertaining a proximity history of the devices that correspond to the at least two device IDs. For the purposes of the invention, determination of a proximity history of any two or more devices shall be understood as determining whether said two or more devices have been within a predefined proximity of each other within a defined time period (preferably a time period closely preceding the detection of said two or more devices within wireless communication range of a terminal device having wireless capabilities). The definitions of device proximity, the time period within which such proximity needs to be established, and the methods of determining proximity may be varied in any number of different ways that would be apparent to a person of skill in the art.

Step 404 comprises determining whether the determined proximity history of the devices satisfies one or more predefined proximity requirements or proximity rules that are associated with the identified user account/payment card account/payment card, or that have been associated with the wireless devices or device IDs themselves. The one or more predefined device proximity requirements or proximity rules may include definitions of any of—(i) the parameters and thresholds used to determine whether two devices are in physical or communication proximity of each other, (ii) a defined time window that immediately precedes detection of the wireless devices by the terminal device, in which the wireless devices are required to be within a specific proximity of each other, (iii) sensors, data or other communication protocols which may be used to ascertain proximity between the wireless devices, and (iv) any other proximity related parameters that require to be satisfied by the devices having wireless capability.

At step 406, in response to a determination that a proximity history of the devices having wireless capability does not satisfy one or more predefined proximity rules associated with the user account/payment card/payment account or with the detected devices having wireless capability, the request for transaction authentication or transaction implementation may be rejected by the authentication server. Conversely, responsive to a determination that a proximity history of the devices having wireless capability satisfies one or more predefined proximity rules, step 406 may comprise authenticating or initiating the requested transaction through the authentication server.

As discussed above definitions of device proximity (and relevant parameters for ascertaining whether proximity thresholds have been met) may be varied depending on security requirements or user or operator preferences. As a general principle, definitions of device proximity may be understood as stating a predefined physical relationship between devices—wherein the relationship is based on distance, such as a radius around a given device, or based on a physical relationship, such as presence in the same room, building, container, bag, package or vehicle, or based on the devices being within a communication range of each other or of any one or more devices (which can be an approximate or varying distance). The time period within which device proximity needs to be established for authentication purposes may also be varied, but would ordinarily comprise a defined time window preceding one or more events associated with the requested transaction (for example, preceding detection of the one or more wireless devices by the terminal device, or preceding receipt of the transaction request at the terminal device or at the authentication server).

Figure 5:
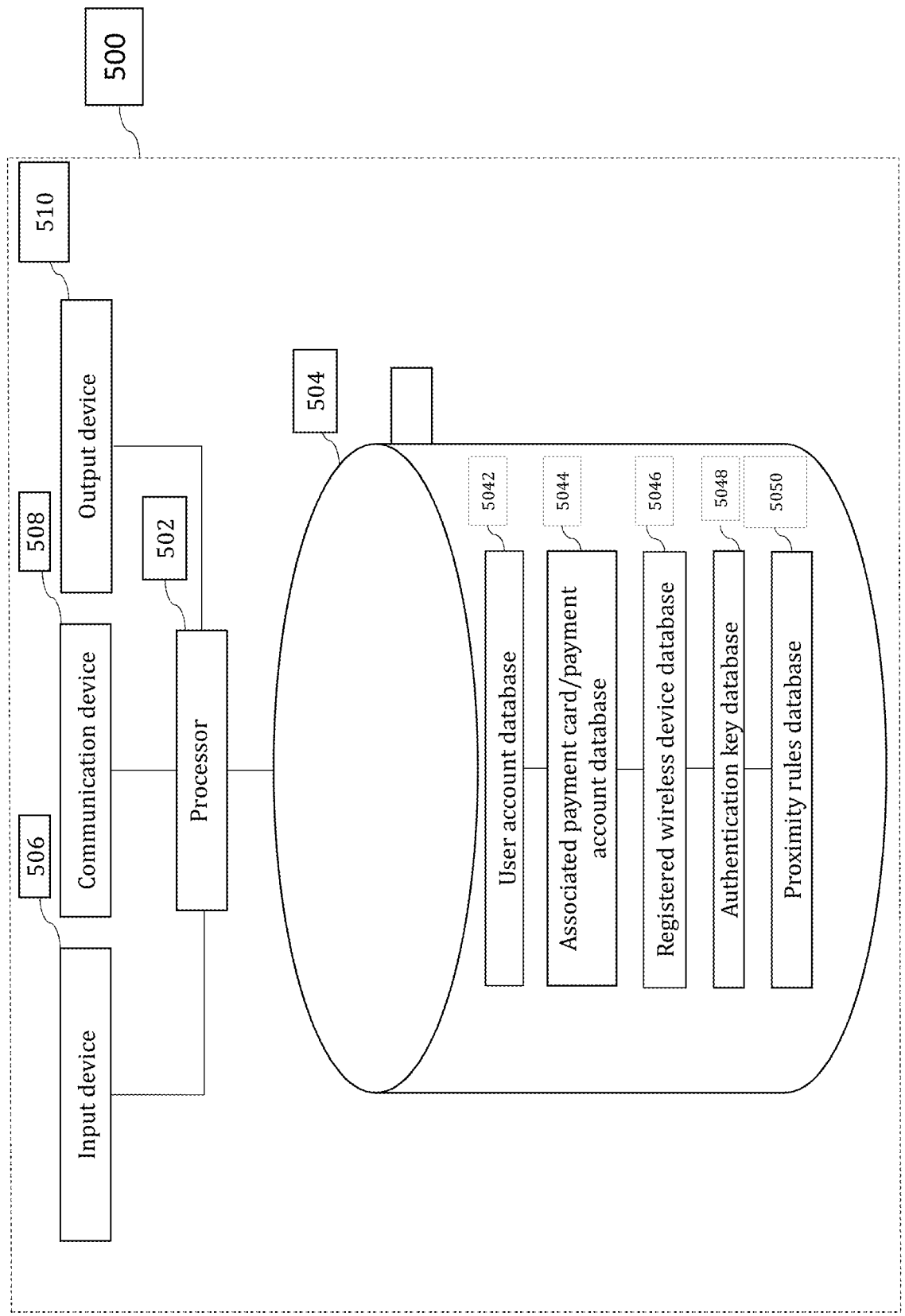
FIG. 5 illustrates an embodiment of an authentication engine in accordance with teachings of the present invention.

It would be understood that methods of determining a proximity history of two or more devices may comprise any method capable of determining the likelihood that two or more devices have been within a defined range or distance of each other within a defined time period—including without limitation, one or more of:

i) Use of position coordinates from GPS sensors (or other global navigational satellite system sensors) within each of the devices ii) Use of peer-to-peer data signals transmitted between the two or more devices, including audio, Bluetooth, Wi-Fi, near-field-communication (NFC), infra-red, or optical data signals iii) Use of identifiers specifying network nodes with which each wireless device is communicating at a specific time or time period iv) Position estimation that is provided as a service of a cellular radio network such as an EDGE, 3G or 4G network v) Use of measured environmental parameters corresponding to each device, wherein one or more environmental parameters detected by each device are compared, and a proximity determination is arrived at based on whether the parameters reported by each device match or are significantly similar to parameters reported by the other devices. Exemplary sensors that may be used to measure environmental parameters for proximity related determinations include accelerometers, barometers, sensors that detect light, sound, temperature, magnetic and/or electric fields, strain force on the device or acceleration FIG. 5 is a block diagram of an exemplary authentication server 500 which may be used in accordance with the methods described above. Authentication server 500 includes processor 502 which is communicably coupled with storage device 504, input device 506, communication device 508 and output device 510.

Processor 502 may include one or more processors and may be configured to execute processor executable steps, contained in program instructions, so as to control authentication server 500 to provide the desired functionality. Input device 506 may include one or more types of peripheral devices used to input data to a computer or processor (for example, a keyboard or a mouse). Communication device 508 may be configured to enable or facilitate communication with other devices, and may include capabilities for sending and receiving messages over wired networks, wireless networks, and mobile telephone networks, as well capabilities for engaging in data communication over data networks. Output device 510 may in exemplary embodiments comprise a display or a printer.

Storage device 504 any comprise any information storage device, including combinations of magnetic storage devices (e.g., hard disk drives), optical storage devices such as CDs or DVDs, semiconductor based memory devices such as Random Access Memory (RAM) and Read Only Memory (ROM), and/or flash memory. As illustrated in FIG. 5, storage device 504 may host one or more of (i) user account database 5042, which stores data corresponding to one or more user accounts created in accordance with the method of FIG. 2A and/or the exemplary data structure of FIG. 2B, (ii) associated payment card/payment account database 5044, which stores data relating to payment cards/payment accounts that have been linked with each registered user account, (iii) registered wireless device database 5046, which stores data relating to the various wireless devices associated with each user account, (iv) authentication key database 5048, which stores authentication keys associated with one or more registered user accounts, and (v) proximity rules database 5050 which stores proximity rules defined or stored in accordance with the teachings and methods discussed in connection with FIG. 4. It would be understood that in certain embodiments, two or more of the databases illustrated as separate databases 5042 to 5050 may in fact consist of data stored under different fields within a single database.

Figure 6:
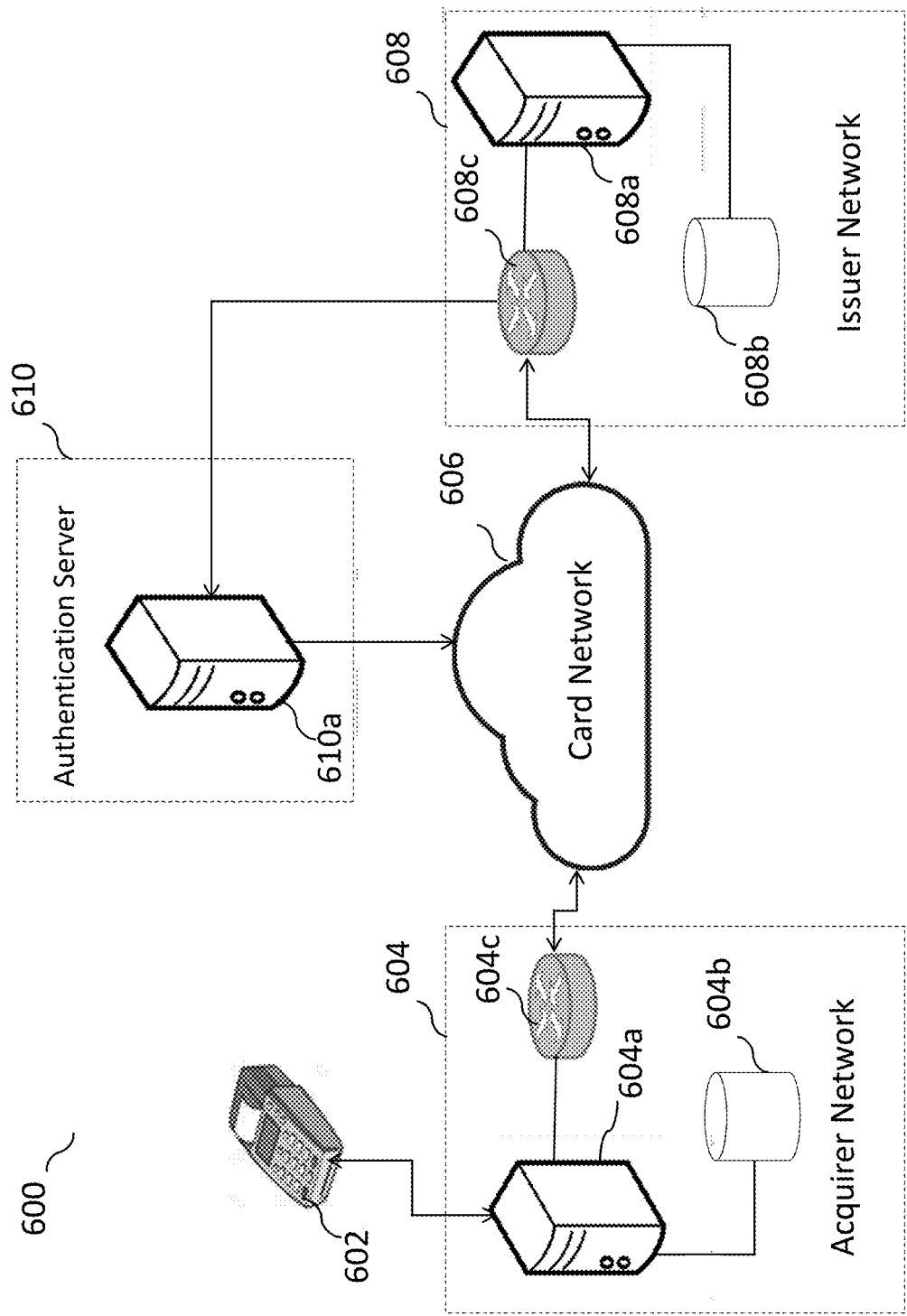
FIG. 6 illustrates an exemplary system configured to implement payment card transactions based on the authentication/transaction implementation methods of the present invention.

FIG. 6 illustrates an exemplary payment card system 600 that has been modified for implementing the above discussed embodiments of the invention. Payment card system 600 includes terminal device (having wireless capabilities) 602, acquirer network 604, card network 606, issuer network 608 and authentication server 610.

In an embodiment, terminal device 602 may be configured to perform any of the terminal device related method steps discussed above in connection with the methods of FIG. 2A, 3 or 4.

Acquirer network 604 may be communicably coupled with terminal device 602, and may comprise server 604a, acquirer network database 604b and interface gateway 604c. Server 604a may be configured to receive and process information relating to payment card transactions. Data relating to permissions relating to the acquirer network may be stored in acquirer network database 604b. Interface gateway 604c may include a hardware or software network gateway configured to enable acquirer network 604 to communicate with entities outside of acquirer network 604 (for example, card network 606).

Card network 606 may be communicably coupled to both acquirer network 604 and issuer network 608, and may, in certain embodiments, serve as a communication intermediary between the acquirer network and the issuer network.

Issuer network 608 may comprise server 608a, issuer network database 608b and interface gateway 608c. Server 608a may be configured to receive and process information relating to payment card transactions. Data relating to permissions associated with the issuer network may be stored in issuer network database 608b. Interface gateway 608c may include a hardware or software network gateway configured to enable issuer network 608 to communicate with entities outside issuer network 608 (for example, card network 606 or authentication server 610).

Authentication server 610 comprises authentication server processor 610a, which may be communicably coupled with one or both of card network 606 and issuer network 608. In various embodiments, authentication server 610 may be located within card network 606, or within issuer network 608, or outside of (but in communication with) both networks—but would in any event be configured to operate according to the invention embodiments described previously. Authentication server 610 may additionally be configured to implement one or more of the method steps of FIG. 2A, 3 or 4 and any of the illustrative embodiments that have been discussed previously.

It would additionally be understood that in various embodiments, authentication server 610 may transmit transaction authorizations or instructions for transaction initiation, to terminal device 602 either directly through card network 606, or routed through issuer network 608.

Figure 7:
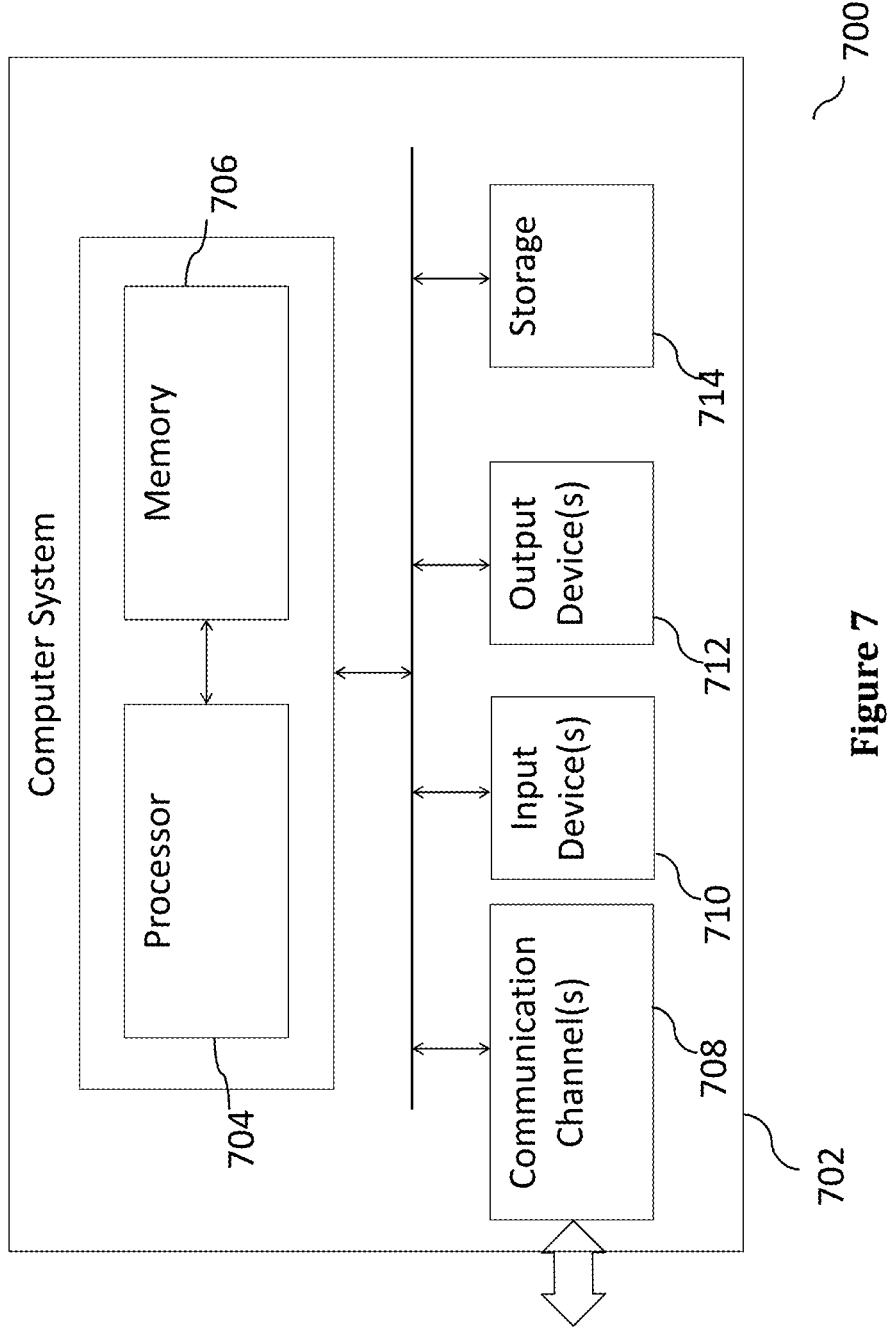
FIG. 7 illustrates an exemplary computer system according to which various embodiments of the present invention may be implemented.

FIG. 7 illustrates an exemplary system 700 for implementing the present invention.

System 700 includes computer system 702 which in turn comprises one or more processors 704 and at least one memory 706. Processor 704 is configured to execute program instructions—and may be a real processor or a virtual processor. It will be understood that computer system 702 does not suggest any limitation as to scope of use or functionality of described embodiments. The computer system 702 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 702 in accordance with the present invention may include one or more servers, desktops, laptops, tablets, smart phones, mobile phones, mobile communication devices, tablets, phablets and personal digital assistants. In an embodiment of the present invention, the memory 706 may store software for implementing various embodiments of the present invention. The computer system 702 may have additional components. For example, the computer system 702 may include one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702 using a processor 704, and manages different functionalities of the components of the computer system 702.

The communication channel(s) 708 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 710 may include, but is not limited to, a touch screen, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 702.

The storage 714 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 702. In various embodiments of the present invention, the storage 714 may contain program instructions for implementing any of the described embodiments.

In an embodiment of the present invention, the computer system 702 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 702. The method described herein is typically implemented as a computer program product, comprising a set of program instructions that is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—including convenient and secure ways for facilitating passive authentication of a user in connection with electronic or payment card based transactions. One immediate benefit is the significant improvement in customer experience due to the fact that the degree of effort or active intervention on the part of the user for commencing and/or carrying out an electronic or payment card based transaction is reduced, while maintaining and improving on security standards.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

We claim:

1. A method for authentication of an electronic transaction, comprising:
    maintaining a data store including a plurality of payment accounts and, for each payment account, one or more device IDs associated with the payment account, wherein each device ID of the one or more device IDs corresponds to a distinct device having wireless communication capability, and wherein for each payment account, the one or more device IDs associated with the payment account comprises a plurality of device IDs forming a set of device IDs, such that each respective set of device IDs associated with each payment account is distinct from sets of device IDs that are associated with other payment accounts of the plurality of payment accounts;
    receiving electronically at a server from a terminal device:
        an electronic payment transaction request; and
        a plurality of device IDs corresponding to devices having wireless communication capability that are detected within a wireless communication range of the terminal device, wherein each device ID of the plurality of received device IDs corresponds to a distinct device having wireless communication capability;
    identifying by the server, based on the received plurality of device IDs, a payment account of the plurality of payment accounts in the data store associated with at least one device ID that matches one of the received plurality of device IDs;
    determining by the server whether each device ID associated with the identified payment account is included in the received plurality of device IDs;
    selecting by the server the identified payment account as a payment account for implementing the requested electronic payment transaction when each device ID associated with the identified payment account is included in the received plurality of device IDs; and
    generating by the server a payment transaction authentication decision,
    wherein the payment transaction authentication decision is based on a determination that proximity data representing proximity of at least two devices having wireless communication capability, relative to each other, conforms to one or more predefined proximity rules associated with the selected payment account, and wherein the set of device IDs associated with the selected payment account includes device IDs corresponding to each of said at least two devices.

2. The method as claimed in claim 1, wherein:
responsive to receiving authentication information that matches an authentication key associated with the selected payment account, the payment transaction authentication decision is a decision approving the electronic payment transaction request; or
responsive to receiving authentication information that does not match an authentication key associated with the selected payment account, the payment transaction authentication decision is a decision declining the electronic payment transaction request.

3. The method as claimed in claim 1, wherein the payment transaction authentication decision is based on one or more transaction instructions associated with either the selected payment account or with the set of device IDs associated with the selected payment account.

4. The method as claimed in claim 1, wherein the one or more predefined proximity rules include one or more of:
a threshold defining whether two wireless devices are within physical or communication proximity of each other,
a defined time window that immediately precedes detection of the wireless devices by the terminal device, in which two wireless devices are required to be within a specific proximity of each other, or
a defined communication protocol used to ascertain proximity between two wireless devices.

5. The method as claimed in claim 1, wherein:
responsive to a determination that the at least two devices having wireless communication capability satisfy a defined minimum threshold for device proximity relative to each other, the payment transaction authentication decision is a decision approving the electronic payment transaction request; or
responsive to a determination that the at least two devices having wireless communication capability fail to satisfy a defined minimum threshold for device proximity relative to each other, the payment transaction authentication decision is a decision declining the electronic payment transaction request.

6. The method as claimed in claim 1, wherein the proximity data is based on data corresponding to any one or more of:
global navigational satellite system sensors associated with one or more of the at least two devices;
audio, Bluetooth, Wi-Fi, near-field-communication (NFC), infra-red or optical sensors associated with one or more of the at least two devices;
identifiers corresponding to network nodes with which one or more of the at least two devices have communicated;
position estimation(s) received from a cellular radio network in respect of one or more of the at least two devices; or
parameter attributes received from accelerometers, barometers, temperature sensors, sensors for magnetic or electric fields, or strain force sensors implemented within or affixed to one or more of the at least two devices.

7. The method as claimed in claim 4, wherein the threshold defining whether two wireless devices are within physical or communication proximity of each other includes a physical distance, a physical relationship, or a communication range;
wherein the defined time window that immediately precedes detection of the wireless devices by the terminal device relates to one or more events associated with the electronic payment transaction request; and
wherein the defined communication protocol used to ascertain proximity between two wireless devices relates to one or more of position coordinates from GPS sensors, peer-to-peer data signals transmitted between the two or more device, or identifiers specifying network nodes with which each wireless device is communicating at a specific time or time period.

8. A system for authentication of an electronic transaction, comprising:
a data store that includes a plurality of payment accounts and, for each payment account, one or more device IDs associated with the payment account, wherein each device ID of the one or more device IDs corresponds to a distinct device having wireless communication capability, and wherein for each payment account, the one or more device IDs associated with the payment account comprises a plurality of device IDs forming a set of device IDs, such that each respective set of device IDs associated with each payment account is distinct from sets of device IDs that are associated with other payment accounts of the plurality of payment accounts;
a processor implemented authentication server configured to:
receive electronically from a terminal device:
an electronic payment transaction request; and
a plurality of device IDs corresponding to devices having wireless communication capability that are detected within a wireless communication range of the terminal device, wherein each device ID of the plurality of received device IDs corresponds to a distinct device having wireless communication capability;
identify, based on the received plurality of device IDs, a payment account of the plurality of payment accounts in the data store associated with at least one device ID that matches one of the received plurality of device IDs;
determine whether each device ID associated with the identified payment account is included in the received plurality of device IDs;
select the identified payment account as a payment account for implementing the requested electronic payment transaction when each device ID associated with the identified payment account is included in the received plurality of device IDs; and
generate a payment transaction authentication decision, wherein the payment transaction authentication decision is based on a determination that proximity data representing proximity of at least two devices having wireless communication capability, relative to each other, conforms to one or more predefined proximity rules associated with the selected payment account, and wherein the set of device IDs associated with the selected payment account includes device IDs corresponding to each of said at least two devices.

9. The system as claimed in claim 8, wherein the authentication server is configured such that:
responsive to receiving authentication information that matches an authentication key associated with the selected payment account, the payment transaction authentication decision is a decision approving the electronic payment transaction request; or responsive to receiving authentication information that does not match an authentication key associated with the selected payment account, the payment transaction authentication decision is a decision declining the electronic payment transaction request.

10. The system as claimed in claim 8, wherein the authentication server is configured such that the payment transaction authentication decision is based on one or more transaction instructions associated with either the selected payment account or with the set of device IDs associated with the selected payment account.

11. The system as claimed in claim 8, wherein the one or more predefined proximity rules include one or more of:
a threshold defining whether two wireless devices are within physical or communication proximity of each other,
a defined time window that immediately precedes detection of the wireless devices by the terminal device, in which two wireless devices are required to be within a specific proximity of each other, or
a defined communication protocol used to ascertain proximity between two wireless devices.

12. The system as claimed in claim 8, wherein the authentication server is configured such that:
responsive to a determination that the at least two devices having wireless communication capability satisfy a defined minimum threshold for device proximity relative to each other, the payment transaction authentication decision is a decision approving the electronic payment transaction request; or
responsive to a determination that the at least two devices having wireless communication capability fail to satisfy a defined minimum threshold for device proximity relative to each other, the payment transaction authentication decision is a decision declining the electronic payment transaction request.

13. The system as claimed in claim 8, wherein the proximity data is based on data corresponding to any one or more of:
global navigational satellite system sensors associated with one or more of the at least two devices;
audio, Bluetooth, Wi-Fi, near-field-communication (NFC), infra-red or optical sensors associated with one or more of the at least two devices;
identifiers corresponding to network nodes with which one or more of the at least two devices have communicated;
position estimation(s) received from a cellular radio network in respect of one or more of the at least two devices; or
parameter attributes received from accelerometers, barometers, temperature sensors, sensors for magnetic or electric fields, or strain force sensors implemented within or affixed to one or more of the at least two devices.

14. The system as claimed in claim 11, wherein the threshold defining whether two wireless devices are within physical or communication proximity of each other includes a physical distance, a physical relationship, or a communication range;
wherein the defined time window that immediately precedes detection of the wireless devices by the terminal device relates to one or more events associated with the electronic payment transaction request; and
wherein the defined communication protocol used to ascertain proximity between two wireless devices relates to one or more of position coordinates from GPS sensors, peer-to-peer data signals transmitted between the two or more device, or identifiers specifying network nodes with which each wireless device is communicating at a specific time or time period.

15. A computer program product for authentication of an electronic transaction, comprising a non-transitory computer usable medium having computer readable program code embodied therein, the computer readable program code comprising instructions for execution on a computing system, the computing system comprising a data store that includes a plurality of payment accounts and, for each payment account, one or more device IDs associated with the payment account, wherein each device ID of the one or more device IDs corresponds to a distinct device having wireless communication capability, and wherein for each payment account, the one or more device IDs associated with the payment account comprises a plurality of device IDs forming a set of device IDs, such that each respective set of device IDs associated with each payment account is distinct from sets of device IDs that are associated with other payment accounts of the plurality of payment accounts,
wherein the instructions, when executed, cause the computing system to:
receive electronically from a terminal device:
an electronic payment transaction request; and
a plurality of device IDs corresponding to devices having wireless communication capability that are detected within a wireless communication range of the terminal device, wherein each device ID of the plurality of received device IDs corresponds to a distinct device having wireless communication capability;
identify, based on the received plurality of device IDs, a payment account of the plurality of payment accounts in the data store associated with at least one device ID that matches one of the received plurality of device IDs;
determine whether each device ID associated with the identified payment account is included in the received plurality of device IDs;
select the identified payment account as a payment account for implementing the requested electronic payment transaction when each device ID associated with the identified payment account is included in the received plurality of device IDs; and
generate a payment transaction authentication decision,
wherein the payment transaction authentication decision is based on a determination that proximity data representing proximity of at least two devices having wireless communication capability, relative to each other, conforms to one or more predefined proximity rules associated with the selected payment account, and wherein the set of device IDs associated with the selected payment account includes device IDs corresponding to each of said at least two devices.

16. The computer program product as claimed in claim 15, wherein the one or more predefined proximity rules include one or more of:
a threshold defining whether two wireless devices are within physical or communication proximity of each other,
a defined time window that immediately precedes detection of the wireless devices by the terminal device, in which two wireless devices are required to be within a specific proximity of each other, or
a defined communication protocol used to ascertain proximity between two wireless devices; and wherein:
responsive to a determination that the at least two devices having wireless communication capability satisfy a defined minimum threshold for device proximity relative to each other, the payment transaction authentication decision is a decision approving the electronic payment transaction request; or responsive to a determination that the at least two devices having wireless communication capability fail to satisfy a defined minimum threshold for device proximity relative to each other, the payment transaction authentication decision is a decision declining the electronic payment transaction request.

17. The computer program product as claimed in claim 15, wherein the proximity data is based on data corresponding to any one or more of:
   global navigational satellite system sensors associated with one or more of the at least two devices;
   audio, Bluetooth, Wi-Fi, near-field-communication (NFC), infra-red or optical sensors associated with one or more of the at least two devices;
   identifiers corresponding to network nodes with which one or more of the at least two devices have communicated;
   position estimation(s) received from a cellular radio network in respect of one or more of the at least two devices; or
   parameter attributes received from accelerometers, barometers, temperature sensors, sensors for magnetic or electric fields, or strain force sensors implemented within or affixed to one or more of the at least two devices.

18. The computer program product as claimed in claim 16, wherein the threshold defining whether two wireless devices are within physical or communication proximity of each other relates to a physical distance, a physical relationship, or a communication range;
   wherein the defined time window that immediately precedes detection of the wireless devices by the terminal device relates to one or more events associated with the electronic payment transaction request; and
   wherein the defined communication protocol used to ascertain proximity between two wireless devices relates to one or more of position coordinates from GPS sensors, peer-to-peer data signals transmitted between the two or more device, or identifiers specifying network nodes with which each wireless device is communicating at a specific time or time period.

\* \* \* \* \*